*(12)* United States Patent
Rasmussen et al.

(10) Patent No.: US 7,865,017 B2
(45) Date of Patent: Jan. 4, 2011

(54) SELECTION OF REGIONS WITHIN AN IMAGE

(75) Inventors: Jamie Rasmussen, Somerville, MA (US); Victor Ivashin, Danville, CA (US)

(73) Assignee: Seiko Epson Corporation, Tokyo (JP)

( * ) Notice: Subject to any disclaimer, the term of this patent is extended or adjusted under 35 U.S.C. 154(b) by 879 days.

(21) Appl. No.: 11/760,177

(22) Filed: Jun. 8, 2007

(65) Prior Publication Data

US 2008/0304698 A1    Dec. 11, 2008

(51) Int. Cl.
*G06K 9/00* (2006.01)
(52) U.S. Cl. ................... 382/181; 382/100; 382/284
(58) Field of Classification Search ............... 382/100, 382/181, 284
See application file for complete search history.

(56) References Cited

U.S. PATENT DOCUMENTS

| 5,596,350 | A | * | 1/1997 | Capps et al. | ............... 345/173 |
|---|---|---|---|---|---|
| 5,966,512 | A | * | 10/1999 | Bates et al. | ............... 709/205 |
| 6,707,932 | B1 | * | 3/2004 | Chakraborty | ............... 382/113 |
| 6,819,806 | B1 | * | 11/2004 | Kubota et al. | ............... 382/309 |
| 6,944,343 | B2 | | 9/2005 | Lefler et al. | |
| 7,081,915 | B1 | | 7/2006 | Hamilton | |
| 7,092,002 | B2 | | 8/2006 | Ferren et al. | |
| 7,152,093 | B2 | | 12/2006 | Ludwig et al. | |
| 2004/0230952 | A1 | | 11/2004 | Massaro et al. | |

OTHER PUBLICATIONS

Ajay Apte, et al., "Recognizing Multistroke Geometric Shapes: An Experimental Evaluation", Nov. 3-5, 1993, pp. 121-128.

\* cited by examiner

*Primary Examiner*—Tom Y Lu (57) ABSTRACT

Apparatus having corresponding methods and computer-readable media comprise a first input circuit to receive first data describing a first region of an image, the first region identified based on user markups of the image; a second input circuit to receive second data describing at least one of a second region of the image, the second region identified by an analysis of the image, and a third region of the image, the third region identified by an analysis of an environment that produced the image; and a synthesizer to identify a fourth region of the image based on the first data and the second data.

17 Claims, 4 Drawing Sheets

SELECTION OF REGIONS WITHIN AN IMAGE

BACKGROUND

The present invention relates generally to image processing. More particularly, the present invention relates to selection of regions within an image.

It is often the case that a person wishes to highlight a region of an image for their later recollection, to bring the region to the awareness of another person, or the like. For example, two geographically-separated engineers use a teleconferencing system to discuss components in a circuit diagram, and highlight each component as it is discussed to avoid confusion. As another example, a quality-assurance technician notices that a button in an application under test is not working properly, and highlights the button in a screen capture submitted with her problem report. As yet another example, a photographer viewing a photograph on his computer highlights an object in the background as a reminder to remove that object from the final image.

There are many possible methods for drawing visual attention to a portion of an image. For example, the image may be cropped to the significant portion. Or, a variety of drawing tools might be used to surround the significant region with the outline of a shape such as a rectangle or ellipse, or to add arrows or other markers on top of the image. Animation effects can be used to cause an important region to flash, to glow, or to have a moving border. The non-significant portions of an image might be darkened, blurred, or otherwise transformed. Yet another method is to add a callout to the image that shows a magnified view of the significant portion. Other highlighting methods are of course possible.

Many of these methods share common problems. For example, a user who does not carefully select the bounds of the highlighted region will often highlight too much or too little, requiring extra attention to correct the selection or communicate the correct selection to another person. None of these methods make use of the information contained in the image itself, which can be a photograph, a diagram, or a blank canvas. If a user wishes to highlight multiple significant regions, extra effort may be required to change the color, shape, or style of subsequent region selections.

SUMMARY

In general, in one aspect, the invention features an apparatus comprising: a first input circuit to receive first data describing a first region of an image, the first region identified based on user markups of the image; a second input circuit to receive second data describing at least one of a second region of the image, the second region identified by an analysis of the image, and a third region of the image, the third region identified by an analysis of an environment that produced the image; and a synthesizer to identify a fourth region of the image based on the first data and the second data.

Some embodiments comprise a sketch recognizer to identify the first region of the image based on the user markups of the image. Some embodiments comprise an image analyzer to perform the analysis of the image, and to identify the second region of the image based on the analysis of the image. Some embodiments comprise an environment analyzer to perform the analysis of the environment that produced the image, and to identify the third region of the image based on the analysis of the environment that produced the image. Some embodiments comprise a datastore to store third data describing a history of at least one of user markups of the image, user markups of other images, the first and second data, the first and second data for other images, the fourth region, and the fourth region for other images; and wherein the synthesizer identifies the fourth region of the image based on the first data, the second data, and the third data. Some embodiments comprise an output circuit to generate signals representing the fourth region of the image.

In general, in one aspect, the invention features an apparatus comprising: first input means for receiving first data describing a first region of an image, the first region identified based on user markups of the image; second input means for receiving second data describing at least one of a second region of the image, the second region identified by an analysis of the image, and a third region of the image, the third region identified by an analysis of an environment that produced the image; and synthesizing means for identifying a fourth region of the image based on the first data and the second data.

Some embodiments comprise sketch recognizing means for identifying the first region of the image based on the user markups of the image. Some embodiments comprise image analyzing means for performing the analysis of the image, and for identifying the second region of the image based on the analysis of the image. Some embodiments comprise environment analyzing means for performing the analysis of the environment that produced the image, and for identifying the third region of the image based on the analysis of the environment that produced the image. Some embodiments comprise means for storing third data describing a history of at least one of user markups of the image, user markups of other images, the first and second data, the first and second data for other images, the fourth region, and the fourth region for other images; and wherein the synthesizing means identifies the fourth region of the image based on the first data, the second data, and the third data. Some embodiments comprise output means for generating signals representing the fourth region of the image.

In general, in one aspect, the invention features computer-readable media embodying instructions executable by a computer to perform a method comprising: receiving first data describing a first region of an image, the first region identified based on user markups of the image; receiving second data describing at least one of a second region of the image, the second region identified by an analysis of the image, and a third region of the image, the third region identified by an analysis of an environment that produced the image; and identifying a fourth region of the image based on the first data and the second data. Some embodiments comprise identifying the first region of the image based on the user markups of the image. Some embodiments comprise performing the analysis of the image; and identifying the second region of the image based on the analysis of the image. Some embodiments comprise performing the analysis of the environment that produced the image; and identifying the third region of the image based on the analysis of the environment that produced the image. Some embodiments comprise receiving third data describing a history of at least one of user markups of the image, user markups of other images, the first and second data, the first and second data for other images, the fourth region, and the fourth region for other images; and identifying the fourth region of the image based on the first data, the second data, and the third data.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments of the present invention enable rapid and accurate selection of regions within an image. Multiple channels of input information are used when selecting a region. The channels include outputs of a sketch recognizer and one or both of an image analyzer and an environment analyzer. The channels can also include a history of previous region selections.

Figure 1:
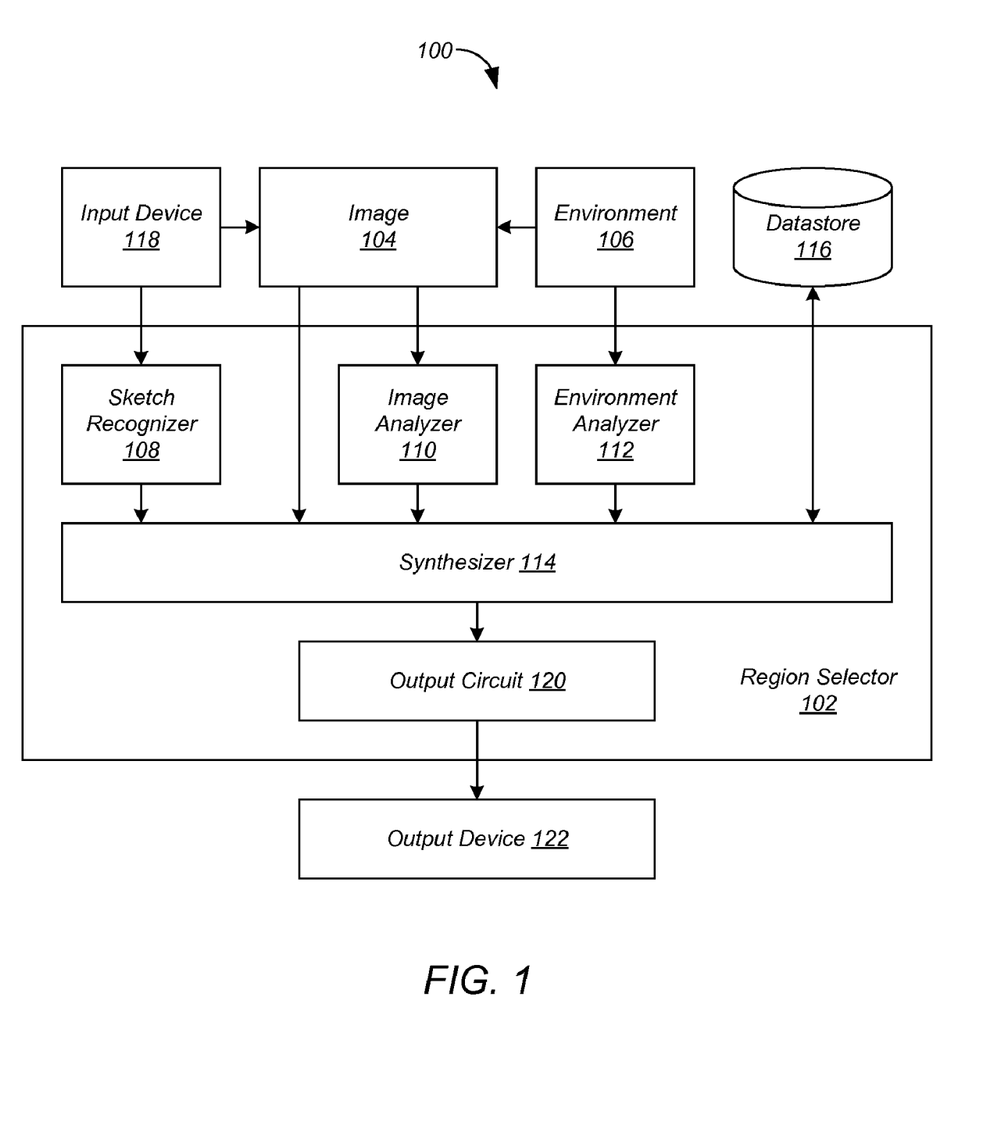
FIG. 1 shows a region selection system comprising a region selector to select regions in an image produced by an environment according to some embodiments of the present invention.

FIG. 1 shows a region selection system 100 comprising a region selector 102 to select regions in an image 104 produced by an environment 106 according to some embodiments of the present invention. Region selector 102 includes a sketch recognizer 108 and one or both of an image analyzer 110 and an environment analyzer 112. Region selector 102 also includes a synthesizer 114. Region selection system 100 can also include a datastore 116. Sketch recognizer 108 receives data describing user markups of image 104 from a user input device 118. Image analyzer 110 performs an analysis of image 104. Environment analyzer 112 performs an analysis of environment 106.

Synthesizer 114 identifies one or more regions of image 104 based on outputs of sketch recognizer 108 and one or both of image analyzer 110 and environment analyzer 112. Region selector 102 can also employ a history of region selections stored in datastore 116. Region selector 102 can also include an output circuit 120 to generate signals representing the selected region(s) of image 104, which can be displayed for example on an output device 122 such as a computer monitor and the like.

Although in the described embodiments, the elements of region selection system 100 are presented in one arrangement, other embodiments may feature other arrangements, as will be apparent to one skilled in the relevant arts based on the disclosure and teachings provided herein. For example, the elements of region selection system 100 can be implemented in hardware, software, or combinations thereof.

Figure 2:
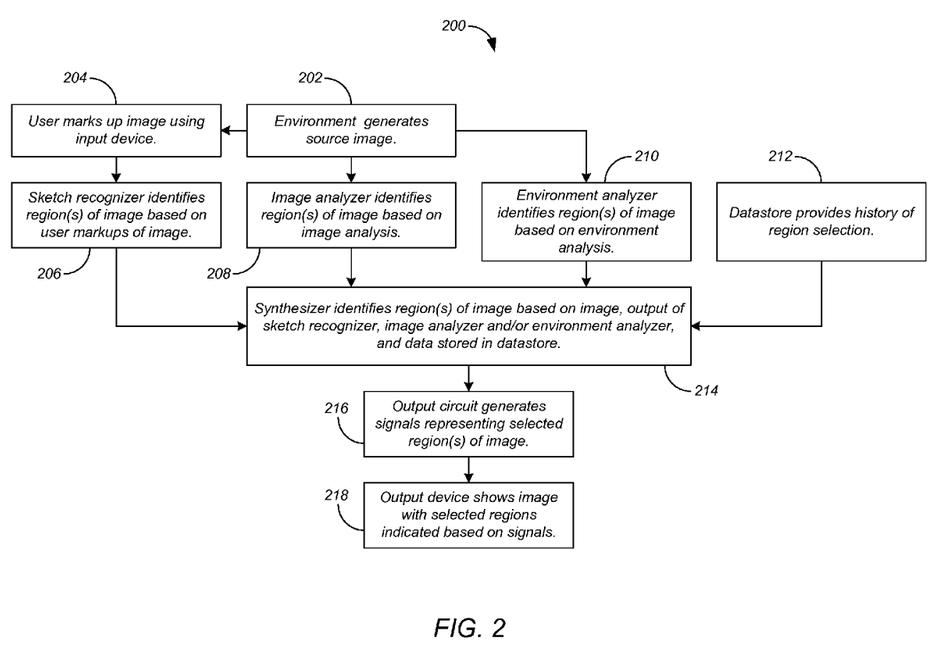
FIG. 2 shows a process for the region selection system of FIG. 1 according to some embodiments of the present invention.

FIG. 2 shows a process 200 for region selection system 100 of FIG. 1 according to some embodiments of the present invention. Although in the described embodiments, the elements of process 200 are presented in one arrangement, other embodiments may feature other arrangements, as will be apparent to one skilled in the relevant arts based on the disclosure and teachings provided herein. For example, in various embodiments, some or all of the steps of process 200 can be executed in a different order, concurrently, and the like.

Environment 106 generates a source image 104 (step 202). Environment 106 can be any environment capable of generating an image, such as a drawing application or a photograph processing application in conjunction with an underlying operating system, and the like. However, image 104 is not limited to image output from an application, but can also include images fabricated by environment 106, images reflecting a view of environment 106, and the like. For example, image 104 can come from an image file, from output by an image provider such as a drawing or photo application, from a capture of the current display pixel content, by generating a view of operating system windows, and the like. For example, a desktop sharing application can employ an embodiment of the present invention to allow a local or remote user to quickly identify windows, controls, buttons, applications, and the like during a live session.

A user marks up image 104 using input device 118 (step 204). For example, the user uses a mouse to highlight a region of image 104 by circling the region with a freeform drawing tool, overlaying a geometric shape onto the region, or the like. Sketch recognizer 108 identifies one or more first regions of image 104 based on the user markups of the image (step 206).

Sketch recognizer 108 can employ any sketch recognition technique. Many different sketch recognition techniques and algorithms exist. For example, some systems use machine learning techniques, starting with a database of known shape samples, and judging the similarity of an input against that database using a number of characteristics. Other approaches are rule-based, using hard-coded tolerances for ideal shape characteristics. Some algorithms may make use of input dimensions such as time and pressure used to draw a stroke; others rely only on the geometry of the frequently sampled pointer position.

Some embodiments of the present invention employ a multi-stroke-aware, rule-based sketch recognition technique that is easy to implement and computationally efficient. This technique is now described with reference to FIG. 3. Further details are provided in Ajay Apte, Van Vo, Takayuki Dan Kimura, "Recognizing Multistroke Geometric Shapes: An Experimental Evaluation", Proceedings Of The 6th Annual ACM Symposium On User Interface Software And Technology, p. 121-128, December 1993, Atlanta, Ga., United States. Sketch recognizer 108 collects pointer data describing user markups of image 104 (step 302). For example, a user starts a region selection by pressing the left button of a mouse. While the mouse button is down, all pointer movement notifications received by sketch recognizer 108 are accumulated. Releasing the mouse button (ending the drag motion) signals the end of a stroke. Multiple strokes may be used to indicate a single shape. If the user does not start a new stroke within a certain time interval, sketch recognizer 108 interprets that as the completion of the shape, and begins the process of recognizing the shape. The duration of the time interval can be constant, or can vary as a function of the stroke or shape drawn to that point. For example, the duration can be computed as a number of milliseconds equal to four times the number of point samples received as part of the active stroke, with a minimum of 500 ms and a maximum of 1500 ms.

Figure 3:
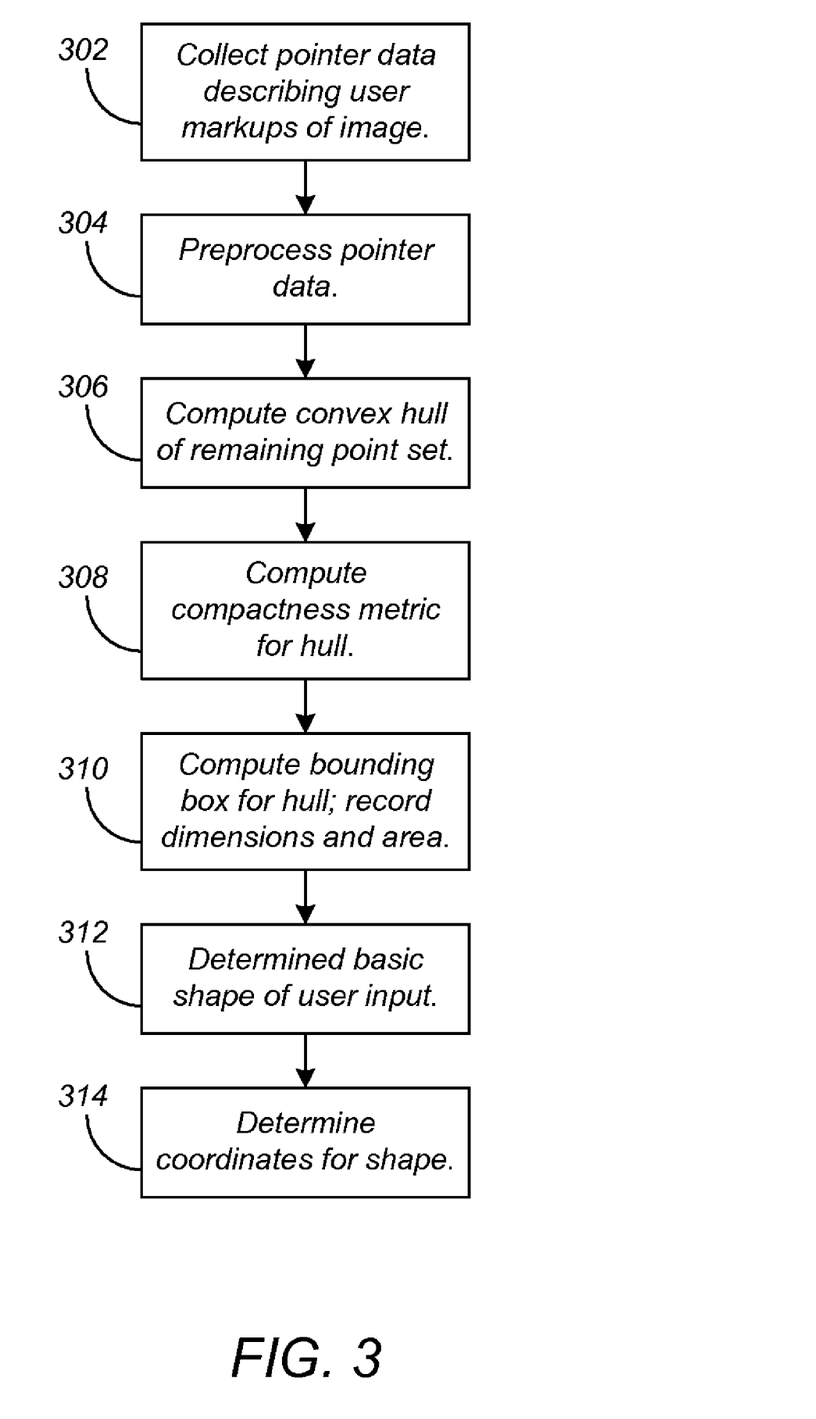
FIG. 3 shows a process for a multi-stroke-aware, rule-based sketch recognition technique according to some embodiments of the present invention.

Sketch recognizer 108 preprocesses the pointer data to improve recognition performance (step 304). The pointer position data is condensed into a single set of points, that is, the order and distribution of points within a stroke is ignored, as are duplicate points. When a user is very rapidly drawing a closed shape with a single stroke there is often an unwanted 'tail' when the end of the stroke is accidentally carried far past the beginning of the stroke. This effect can drastically impact the shape analysis in unwanted ways, so sketch recognizer 108 checks for this case prior to forming the point set, and ignores any unwanted tail.

Sketch recognizer 108 computes the convex hull of the remaining point set (step 306). Many techniques exist for this operation, any of which can be used. In some embodiments, sketch recognizer 108 uses the common Graham Scan method. Sketch recognizer 108 checks the hull against a few particular shapes such as point or a line segment. If there is a match, sketch recognizer 108 returns that shape. Otherwise sketch recognizer 108 computes the perimeter and area of the hull. A convex hull is a simple polygon, and its area can be computed using the Trapezoid Rule.

Sketch recognizer 108 computes a compactness metric, C, for the hull using a function of its perimeter, P, and area, A (step 308), as shown in equations (1).

$$C = \frac{P^2}{A} \quad (1)$$

Sketch recognizer 108 also computes the minimal axis-aligned rectangle or 'bounding box' for the convex hull, and records its dimensions and area (step 310). These values are used as inputs to a simple hierarchy of rules to decide the eventual output shape, though a more complicated system of weighted rules can be used to make this determination.

The value of the compactness C for ideal shapes is known. For example, a square with sides of length S has compactness $$C = \frac{(4S)^2}{S^2} = \frac{16S^2}{S^2} = 16 \quad (2)$$

(constant for any value of S) and a circle with radius R has compactness $$C = \frac{(2\pi R)^2}{\pi R^2} = \frac{4\pi^2 R^2}{\pi R^2} = 4\pi \approx 12.5664 \quad (3)$$

(constant for any value of R).

Sketch recognizer 108 can compare the hull's compactness value with these known values as an indication of the shape indicated by the pointset. For example, a well-known mathematical result is that a circle has the smallest possible value for this metric, so if $C_{hull}$ is in the range of perhaps $[4\pi, 4\pi+1]$ sketch recognizer 108 determines that the user was indicating a circular region. If $C_{hull}$ is very large it means the hull is long and thin, and sketch recognizer 108 determines that the user was indicating a line. After eliminating some shapes as possibilities, others become more likely.

Sketch recognizer 108 also considers the ratio of the convex hull's area to the area of its bounding box. The convex hull and the bounding box for an axis-aligned rectangle are the same shape (the rectangle itself), so this ratio will be 1.0. If the measured ratio is near 1.0 sketch recognizer 108 returns that rectangle as the recognized shape. The area ratio for an axis-aligned ellipse will be close to 0.8, and so on. Sketch recognizer 108 can distinguish squares from other rectangles by checking if the ratio of the shape's width and height falls within a threshold. The circle vs. other ellipse distinction having already been made by that point by virtue of the compactness metric. Once sketch recognizer 108 has determined the basic shape of the user input (step 312), sketch recognizer 108 determines the coordinates for that shape based on the input points (step 314), also according to conventional techniques. Of course, sketch recognizer 108 can employ sketch recognition techniques other than those described above, as will be apparent to one skilled in the relevant arts based on the disclosure and teachings provided herein.

Referring again to FIG. 2, image analyzer 110 performs an analysis of image 104, and identifies one or more second regions of image 104 based on the analysis (step 208). Image analyzer 110 can employ any image analysis technique. Many different image analysis techniques and algorithms exist. There are well-known techniques, for example, for identifying simple shapes such as lines, circles, and rectangles within a source image using only its pixel data, for example such as variations on the Hough Transform.

Figure 4:
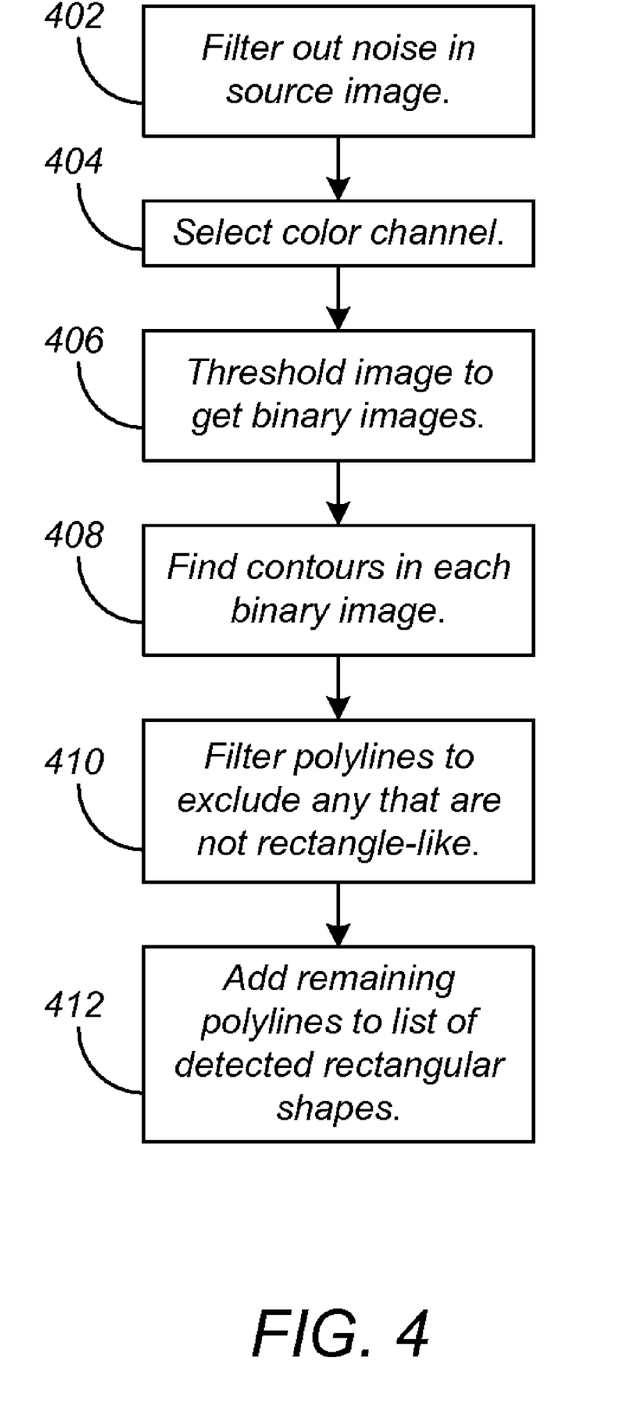
FIG. 4 shows a rectangle detection technique according to some embodiments of the present invention.

In some embodiments, image analyzer 110 employs a rectangle detection technique, as shown in FIG. 4. The rectangle detection technique returns a list of rectangles. The described rectangle detection technique is easy to implement. In addition, rectangles are common in source images. Of course, standard image analysis techniques for detection of other shapes such as lines or circles can be used instead of, or in addition to, this rectangle-detection process.

Rectangle detection begins by filtering out noise in source image 104 (step 402), for example by down-sampling and then up-sampling image 104 including a Gaussian blurring. An empty list is created to hold the detected rectangles. Rectangle detection is performed on each color channel (for example, red, green, and blue channels) separately (step 404), with any rectangles discovered being added to the overall list. Each channel is treated as a grayscale image, and the image is thresholded at a number of levels (for example, 10 intervals in the 0-255 range) to get binary images (step 406).

Image analyzer 110 finds the contours in each binary image (step 408). Each contour is a polyline, and after being computed, is approximated with a simpler polyline, for example using the Douglas-Peucker algorithm. After simplification, image analyzer 110 filters the polylines to exclude any that are not rectangle-like (step 410), for example, those that contain more than four vertices, or that are concave, or that contain angles radically different from 90 degrees (for example, angles that are less than 73 degrees or greater than 107 degrees). Any remaining polylines are considered rectangle-like, and are added to the list of detected rectangular shapes (step 412).

Some rectangular shapes contain a gradient pattern, for example when the source image is a screen capture of an interactive application running in a desktop environment. To better detect these rectangles, the contour analysis can also be done once for the dilated output of the Canny edge detection algorithm on each color channel.

Referring again to FIG. 2, environment analyzer 112 performs an analysis of the environment 106 that produced image 104, and identifies one or more third regions of the image based on the analysis (step 210). Knowing the environment 106 that produced source image 104 provides information as to the content of image 104. For example, it may be known that a certain text-editing application shows only text, with no images or other diagrams. Therefore image analysis is unlikely to generate accurate shapes. On the other hand, a diagramming application is very likely to contain simple shapes such as rectangles and ellipses, so extra resources can be allocated to detecting that kind of shape, or updating the parameters of sketch recognizer 108 to improve the detection of those shapes.

As a further example, in operating systems employing graphical user interfaces, many applications are composed of multiple rectangular "windows." These windows generally include toolbars, menu bars, standard controls such as input boxes and dropdown lists, and the like. Such operating systems generally provide methods for enumerating the coordinates of these windows, which can be much more efficient than recovering that information from the pixels that make up the picture of the windows. In addition to being more computationally efficient by using stored values instead of image processing, this technique makes it irrelevant if the window is not perfectly rectangular (for example, a rounded rectangle), which can inhibit detection by image analysis alone.

As another example, conceptual regions in an image may not be connected, or can be misleadingly connected in the actual image data. For example, the source image 104 may be a snapshot of an operating system's desktop that may have disjoint or overlapping windows, causing the region corresponding to an application to no longer have a simple rectangular shape. Environment analysis can be used to highlight all physical regions corresponding to a single conceptual region when the user sketch indicates only one of the physical regions.

Datastore 116 stores a history of data such as user markups of image 104, markups by the same user and other users of image 104 and other images, and outputs of sketch recognizer 108, image analyzer 110, environment analyzer 112, and synthesizer 114 for image 104 and other images. That is, datastore 116 is used to store a history of user actions, the result of the ensuing computations, and their consequences. For example, synthesizer 114 may create a listing of regions based on outputs of sketch recognizer 108 and one or both of image analyzer 110 and environment analyzer 112, ranking the listing by an estimate of the likelihood that the returned region matches the user's intention. If there are multiple regions that are equally probable, synthesizer 114 can offer the choice of regions to the user, recording that choice in datastore 116 to better evaluate the user's future sketches. Input from datastore 116 can also allow the synthesizer 114 to know that the user has just deleted a region much like the one synthesizer 114 is about to return, and that an alternate region or choice of regions should be returned instead. By analyzing sketches from many users, input from datastore 116 can be used to tune sketch recognizer 108 for a particular user population.

Another use for datastore 116 is to record selections made on the image 104 or related images across multiple users or sessions. For example, region selection system 100 can be used as part of a software usability testing environment. Users can be shown an image representing a software interface, and asked to indicate regions that are particularly confusing, unattractive, and the like. The aggregated responses can then be reported to user interaction or software development teams, for example using a translucent heat map-style overlay.

Datastore 116 can also be useful if region selection system 100 is providing visual feedback to the user as a shape is being drawn. If datastore 116 contains an instance of another sketch for source image 104 that started in the same area, region selection system 100 can offer that previously selected region as a possibility for the new selection.

Referring again to FIG. 2, datastore 116 provides the history of region selection to synthesizer 114 (step 212). Synthesizer 114 identifies one or more regions of image 104 based on the image 104, output of sketch recognizer 108 and one or both of image analyzer 110 and environment analyzer 112, and data stored in datastore 116, if used (step 214). For example, synthesizer 114 can include input circuits to receive the outputs and data.

In some embodiments, synthesizer 114 is designed for maximum correctness. Each analysis component (that is, sketch recognizer 108 and one or both of image analyzer 110 and environment analyzer 112) outputs an ordered list of the most likely selected regions for the input used, ranked by the 'distance' of the input to the region by some metric. This distance can be interpreted as the component's 'confidence' that the region is the one intended by the user. Synthesizer 114 receives the ordered lists, and chooses the region with the best confidence score, returns an amalgamation of the most likely regions, or the like. The technique used to resolve conflicts in the rankings can be optimized for a particular selection task or universe of source images.

In other embodiments, synthesizer 114 is designed to maximize processing speed, with analysis components consulted sequentially based on the relative cost of their computations, and with a region returned as soon as one within certain tolerances is identified. Additional regions can be computed on idle time in case the user rejects the returned region. For example, the bounding box of the user's input can be computed very quickly, and if the resulting rectangle is very close to a rectangle given by environment analyzer 112, the more computationally expensive image analysis processing or datastore searching might be avoided.

For a simple example of region ranking, assume that the coordinates of a rectangle are designated $R_{left}$, $R_{right}$, $R_{top}$, and $R_{bottom}$. A reasonable choice for the distance function for two rectangles can be the sum of the Euclidean distance between the rectangles' top-left corners and the Euclidean distance between the rectangles' bottom-right corners:

$$D = \sqrt{(RB_{left} - RA_{left})^2 + (RB_{top} - RA_{top})^2} + \sqrt{(RB_{right} - RA_{right})^2 + (RB_{bottom} - RA_{bottom})^2} \quad (4)$$

Detected rectangles (from either image or environment analysis) can be sorted using this distance function. Candidate rectangular regions may be judged "close enough" to a user input if the value of D is below some constant or function of the user input.

Output circuit 120 generates signals representing the selected region(s) of the image (step 216). Output device 122 shows image 104 with the selected regions indicated based on the signals provided by output circuit 120 (step 218). For example, the selected regions can be visually distinguished through the use of grayscale conversion and a translucent black overlay, can be outlined with a very thin colored line, and the like. This makes the selected regions more visible when they intersect a black region of the source image 104, as pure black regions are unaffected by both grayscale conversion and composition with a translucent black overlay. Of course, there are many possible visual representations of selected regions, and that representation may be chosen based on knowledge of the context or the universe of source image inputs. Furthermore, the output is not limited to a visual representation on a computer screen, but can also include storage or transmission of the significant region coordinates, and the like.

Process 200 can be employed iteratively to refine the output. For example, synthesizer 114 can output a set of likely regions based on the initial input (for example, the top three possibilities), thereby allowing the user to select the best region. As another example, sketch recognizer 108 can update synthesizer 114 with a "sketch guess" before sketch recognition is fully completed. Synthesizer 114 can produce intermediate results, which can be displayed in a different manner than final results. Say sketch recognizer 108 has found an elliptical region based on a careless sketch input, and the intermediate results from synthesizer 114 show the ellipse rather than the rectangle the user is expecting. This feedback to the user about the current sketch recognition result allows the user to more carefully continue drawing and sharpening the corners of the region during the sketch so that sketch recognition finds the desired rectangular region, and synthesizer 114 produces the final results required.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
a first input circuit to receive first data describing a first region of an image, the first region identified based on user markups of the image;
a second input circuit to receive second data describing at least one of
a second region of the image, the second region identified by an analysis of the image, and
a third region of the image, the third region identified by an analysis of an environment that produced the image; and
a synthesizer to identify a fourth region of the image based on the first data and the second data.

2. The apparatus of claim 1, further comprising:
a sketch recognizer to identify the first region of the image based on the user markups of the image.

3. The apparatus of claim 1, further comprising:
an image analyzer to perform the analysis of the image, and to identify the second region of the image based on the analysis of the image.

4. The apparatus of claim 1, further comprising:
an environment analyzer to perform the analysis of the environment that produced the image, and to identify the third region of the image based on the analysis of the environment that produced the image.

5. The apparatus of claim 1, further comprising:
a datastore to store third data describing a history of at least one of
user markups of the image,
user markups of other images,
the first and second data,
the first and second data for other images,
the fourth region, and
the fourth region for other images; and
wherein the synthesizer identifies the fourth region of the image based on the first data, the second data, and the third data.

6. The apparatus of claim 1, further comprising:
an output circuit to generate signals representing the fourth region of the image.

7. An apparatus comprising:
first input means for receiving first data describing a first region of an image, the first region identified based on user markups of the image;
second input means for receiving second data describing at least one of
a second region of the image, the second region identified by an analysis of the image, and
a third region of the image, the third region identified by an analysis of an environment that produced the image; and
synthesizing means for identifying a fourth region of the image based on the first data and the second data.

8. The apparatus of claim 7, further comprising:
sketch recognizing means for identifying the first region of the image based on the user markups of the image.

9. The apparatus of claim 7, further comprising:
image analyzing means for performing the analysis of the image, and for identifying the second region of the image based on the analysis of the image.

10. The apparatus of claim 7, further comprising:
environment analyzing means for performing the analysis of the environment that produced the image, and for identifying the third region of the image based on the analysis of the environment that produced the image.

11. The apparatus of claim 7, further comprising:
means for storing third data describing a history of at least one of
user markups of the image,
user markups of other images,
the first and second data,
the first and second data for other images,
the fourth region, and
the fourth region for other images; and
wherein the synthesizing means identifies the fourth region of the image based on the first data, the second data, and the third data.

12. The apparatus of claim 7, further comprising:
output means for generating signals representing the fourth region of the image.

13. Non-transitory computer-readable media embodying instructions executable by a computer to perform a method comprising:
- receiving first data describing a first region of an image, the first region identified based on user markups of the image;
- receiving second data describing at least one of
  - a second region of the image, the second region identified by an analysis of the image, and
  - a third region of the image, the third region identified by an analysis of an environment that produced the image; and
- identifying a fourth region of the image based on the first data and the second data.

14. The computer-readable media of claim 13, wherein the method further comprises:
- identifying the first region of the image based on the user markups of the image.

15. The computer-readable media of claim 13, wherein the method further comprises:
- performing the analysis of the image; and
- identifying the second region of the image based on the analysis of the image.

16. The computer-readable media of claim 13, wherein the method further comprises:
- performing the analysis of the environment that produced the image; and
- identifying the third region of the image based on the analysis of the environment that produced the image.

17. The computer-readable media of claim 13, wherein the method further comprises:
- receiving third data describing a history of at least one of
  - user markups of the image,
  - user markups of other images,
  - the first and second data,
  - the first and second data for other images,
  - the fourth region, and
  - the fourth region for other images; and
- identifying the fourth region of the image based on the first data, the second data, and the third data.

* * * * *